(12) United States Patent
Komenda et al.

(10) Patent No.: US 12,270,507 B2
(45) Date of Patent: Apr. 8, 2025

(54) FASTENER FOR ATTACHING STRUCTURES TO A TREE

(71) Applicants: Gerhard Komenda, East Chatham, NY (US); Lukas Scheurer, Providence, RI (US)

(72) Inventors: Gerhard Komenda, East Chatham, NY (US); Lukas Scheurer, Providence, RI (US)

( * ) Notice: Subject to any disclaimer, the term of this patent is extended or adjusted under 35 U.S.C. 154(b) by 289 days.

(21) Appl. No.: 17/301,938

(22) Filed: Apr. 19, 2021

(65) Prior Publication Data
US 2021/0356075 A1 Nov. 18, 2021

Related U.S. Application Data

(60) Provisional application No. 62/704,569, filed on May 15, 2020.

(51) Int. Cl.
*F16B 25/00* (2006.01)
*F16B 37/04* (2006.01)
*F16M 13/02* (2006.01)

(52) U.S. Cl.
CPC ......... *F16M 13/02* (2013.01); *F16B 25/0057* (2013.01); *F16B 37/04* (2013.01); *F16B 25/00* (2013.01)

(58) Field of Classification Search
CPC ...... F16B 5/0275; F16B 5/0283; F16B 23/00; F16B 25/00; F16B 25/0057; F16B 25/0068; F16B 35/06; F16B 35/065; F16B 37/04; F16M 13/02

USPC ........ 411/378, 382, 383, 389, 411, 412, 422
See application file for complete search history.

(56) References Cited

U.S. PATENT DOCUMENTS

| | | | | |
|---|---|---|---|---|
| 5,030,052 A * | 7/1991 | Anderson | ............... | F16B 35/00 411/383 |
| 5,897,279 A * | 4/1999 | Bentley | ................... | F16B 35/00 52/11 |
| 7,588,402 B2 * | 9/2009 | Chuang | ................. | F16B 25/103 411/383 |
| 8,087,626 B1 * | 1/2012 | Weeden | ................. | F16M 13/02 248/220.21 |
| 8,109,706 B2 * | 2/2012 | Richards | ............... | F16B 35/044 411/378 |
| 9,377,047 B2 * | 6/2016 | Hill | ........................ | F16B 5/0642 |
| 2006/0198717 A1 * | 9/2006 | Fuest | ...................... | F16B 45/00 411/401 |
| 2007/0053766 A1 * | 3/2007 | Lin | ........................ | F16B 39/282 411/389 |
| 2009/0133357 A1 * | 5/2009 | Richards | ............... | F16B 35/044 411/383 |
| 2009/0162141 A1 * | 6/2009 | Borgman | ................. | F16B 43/00 403/374.4 |
| 2009/0175701 A1 * | 7/2009 | Wu | ........................ | F16B 35/045 411/383 |

\* cited by examiner

*Primary Examiner* — Roberta S Delisle (57) ABSTRACT

A fastener for attaching structures to a tree employs, in an embodiment, a hanger bolt, a protective collet, and a mounting bracket for attaching a support structure to a tree in a way that minimizes damage to the tree. In some embodiments, an extending member adds length to the bolt. The mounting bracket attaches to the bolt. The bracket serves to affix hardware and separate support structures to a tree.

11 Claims, 8 Drawing Sheets

FASTENER FOR ATTACHING STRUCTURES TO A TREE

TECHNICAL FIELD

The present disclosure relates to fasteners in general and more specifically to devices that fasten to a living tree with minimal harm to the tree.

CPC Schemes might include: Apparatus for climbing poles, trees, or the like ({ropes A63B 29/02;} safety belts for climbers A62B 35/00) E01D: CONSTRUCTION OF BRIDGES, {ELEVATED ROADWAYS} OR VIADUCTS; ASSEMBLY OF BRIDGES (bridges extending between terminal buildings and aircraft for embarking or disembarking passengers B64F 1/305; {tracks for special kinds of railways E01B 25/00; culverts E01F 5/005}) E01D 15/00, Movable or portable bridges; Floating bridges; E04H15/04 Tents combined or specially associated with other devices suspended type, e.g. from trees, from cantilever supports.

BACKGROUND

Hunting mounts, treehouses and platforms are attached to trees for sporting and recreation purposes. When incorrectly installed or repeatedly repaired, commonly used attaching devices can damage trees. Only healthy trees can withstand injury, and they do this by growing soft, structural material (the cambium) each year.

Installation of an attaching mechanism that accounts for dendrological growth can minimize damage and assure tree healing within the first growth season after installation, withstanding human interference and allowing unimpeded tree growth.

Tree-mounting systems enable a hanger bolt to serve as a horizontal support for structures atop or hanging from it, at the same time holding horizontal loads for attachment of suspension bridge-type elements. Multi-purpose attachments may be attached in various applications, e.g., for building a tree deck or wire-rope mounting system. Such mounting systems obviate the repeated repair or reinstallation of structures or wire-rope apparatuses from the tree. As a tree grows it envelopes man-made structures and wire ropes, impeding growth and causing the tree to weaken as it is unable to support additional loads. This results in the tree "girdling" itself and dying. The faster any wound can be overgrown, the lower the chance of infection by bacteria, mold, viruses and insects.

Bolts for fastening to trees are sometimes referred to as treehouse bolts or tree bolts. Unified National Threads and ISO (metric) threads are commonly used for bolts and shafts intended to accept a nut. One skilled in the art understands the general use of threaded rods and bolts and that metric threads may be used as well as unified national course and fine configurations of either.

The study of tree growth is known as dendrology. Parts of a tree include the cambium, phloem, sapwood and bark. The outermost, insulating later of a tree trunk is the outer bark. The inner bark also known as the phloem, and it serves as the pipeline through which food is passed. The tree's phloem lives for a short period of time before it dies and turns into cork, becoming another layer to protect the tree. The growing part of a tree trunk is the cambium or cambium cell layer. It is the new bark and new wood that grows annually in response to the tree's hormones. Sapwood is a tree's new wood; as new layers of sapwood are produced, the inner cells lose their vitality and become heartwood. Heartwood lies at the center of a tree.

SUMMARY

A fastener for attaching structures to a tree employs a hanger bolt, a protective collet, and a mounting bracket for attaching a support structure to a tree in a way that minimizes damage to the tree. In some embodiments, an extending member adds length to the bolt. The mounting bracket attaches to the bolt. The bracket serves to affix hardware and separate support structures to a tree.

The apparatus reduces damage to a tree by minimizing the effects of movement of built structures that are attached to the tree. By protecting the growing layer of the tree (the cambium) from movement of installed parts, the cambium can grow over the bolt of the apparatus over time. Extensions added to the apparatus allow for continued functionality after the initially installed part becomes embedded in the growing tree. Extending the apparatus rather than replacing it enables re-use of a tree without further damaging it as it lets the tree heal over the apparatus after installation.

A hanger bolt has a wood-screw thread at one end and a shaft for receiving a collet. Variously sized protective collets are for receiving, aligning, and holding the bolt in place to minimize damage to the cambium. The bolt has a hexagonal boss near the distal end which, during installation, stops the bolt in place so that its adjacent smooth-shank section lands and is held in the protective collet. Adjacent to the hexagonal boss, several inches of machine threads accept various fixtures, hardware and extenders.

As the collet also aligns the bolt during installation, it facilitates even torque and prevents skew during installation, enabling an accurate mount and resulting in the smallest effective hole drilled into the tree. This makes the attached structures more stable. The protective collet allows the bolt to rotate within it, so that any damage caused by this movement is absorbed by the protective collet rather than to the vital, growing layer of the tree. A collet is sized according to required load ratings of an intended purpose. As the tree adds living cells, the tiny space between the collet and the cambium is closed up, hence closing the wound in the shortest possible time and preventing pathogens from invading the tree's vascular system.

Once a three-stage hole is drilled (with disinfected tools), the collet is inserted into the first stage of the hole. Then, with the collet acting as a guide for the bolt, the distal end of the bolt is screwed into a tree through the center opening of the collet. The bolt is screwed to a depth that embeds the distal end to a depth of a protective collet, leaving the hex boss exposed. After the tree grows over the hex boss the bolt is less likely to twist in the hole, thus making the bolt more firmly mounted over time and preventing damage to the tree that would otherwise result from the bolt's movement.

Once the hanger bolt is installed, the mounting bracket can be affixed to the exposed part of the bolt. The mounting bracket is a hollow, flanged assembly with one or more latitudinally oriented threaded posts. These accept a clamping plate and mating nuts. The bracket is placed onto the hanger bolt and is attached to it longitudinally with hex nuts, which accepts a clamping plate and mating nuts.

Once the tree's cambium has grown over the usable portion of the initially installed bolt, an extension member may be installed to lengthen the bolt. Extension can be repeated as long as the tree is alive or until the attaching structure is no longer used. As the hanger bolt is enveloped by the tree, the strength of the system actually increases. One iteration of the extendable attachment hardware allows an increase of several inches of tree diameter growth before any adjustment is needed.

The hanger bolt's inner thread normally holds a hex bolt at its proximal end. This hex bolt is normally used for initial installation of the hanger bolt via a power wrench with centered torque. By unscrewing the hex-bolt, the extension may be screwed into the proximal end's same inner thread, adding several inches of hanger bolt. The previously removed hex-bolt may then be screwed into the end of the extender.

The apparatus allows the bolt to serve as a horizontal support for structures atop or hanging from it, at the same time holding horizontal loads for attachment of suspension bridge-type elements.

Once the apparatus is installed onto a tree, the tree will compartmentalize the area and prevent sap flow at the penetration area. Every year's growth of new wood ("sapwood") will reverse this process and allow for sap to flow through the new sapwood. The new growth will travel over and eventually envelope the collet. An example collet of a 1" thickness will usually be enveloped within two years. By this time the bolt will have become an artificial limb similar to the stud of a human tooth implant. Once enveloped, the bolt's hexagonal boss increases the strength of the bolt.

Various slide-on attachment parts may be adjusted in numerous ways. One iteration serves two functions: at the top, a plate with hole slots holds the wood framing members to secure a platform with wood screws. On the bottom, two half-rings, or a single wire rope of the same diameter as that created by the mounting brackets around the tree, are clamped together to form a solid anchor ring beneath the deck. The resulting attachment is unobtrusive, minimizing the commonly large "step-down," and obviating the tripping hazard of bridge and obstacle cables that may lay on top of the deck/platform.

The apparatus's screw bolts can alternatively hold different kinds of mounting brackets or fixtures to increase the flexibility and strength for complicated structure-attachment needs.

Because of the design strength and configuration variations, the apparatus can, in some instances, reduce the platform screw bolt number from the commonly required four anchor points to three anchor points, enabling attachment to trees as small as 12 inches in diameter, without substantially weakening the wood.

The following drawings illustrate rather than define the limits of the invention.

DESCRIPTION

Figure 1:
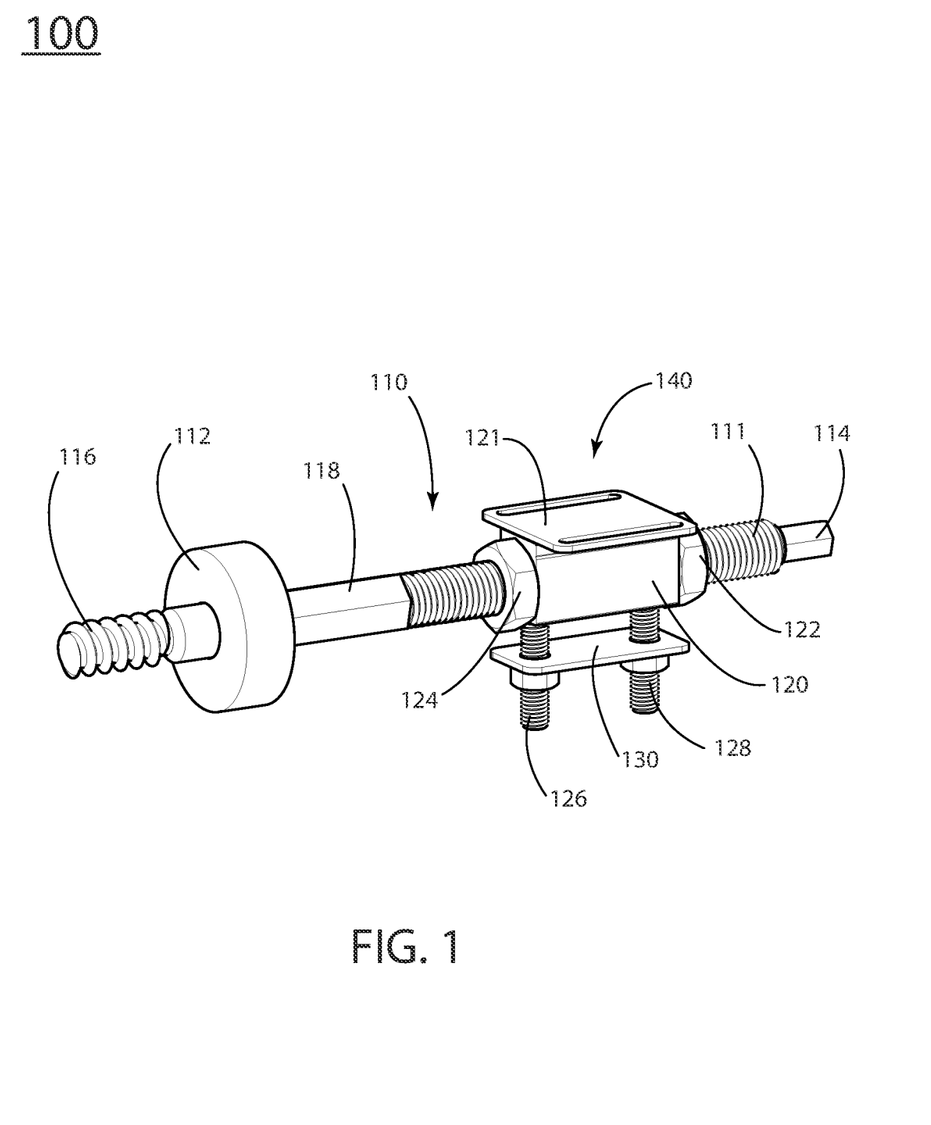
FIG. 1 is a perspective view of an example embodiment of the disclosure.
Figure 2:
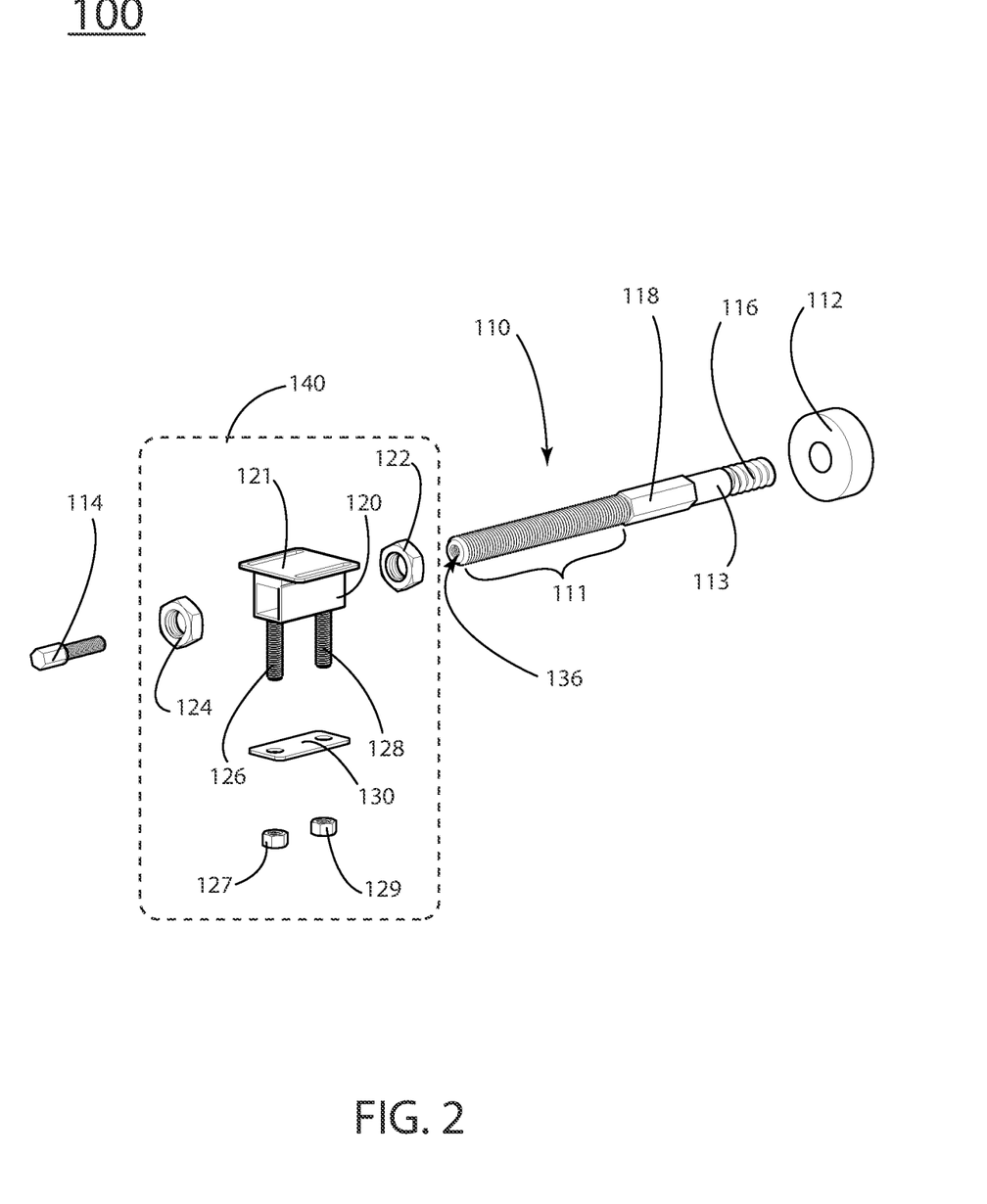
FIG. 2 is a perspective, partially exploded view of the embodiment of FIG. 1.

FIGS. 1 and 2 show the hanger bolt's main shaft 110 having a threaded portion 111 to mate with nuts 122 and 124, a threaded hole 136, a faceted portion (in this illustration, a hex screw) 118, a smooth-shank portion 113 and a wood-screw portion 116. In some embodiments the wood-screw portion has threads similar to a lag screw. The wood-screw portion 116 is disposed on the distal end of the hanger bolt's main shaft 110, while the threaded hole 136 is at the proximal end. The smooth-shank portion 113 resides proximal to the wood-screw portion 116. The faceted portion 118 is proximal to the smooth-shank portion and the threaded portion 111 is proximal to the faceted portion 118.

A mounting bracket assembly 140 is designed to be affixed to the main shaft 110, about the threaded portion 111. The mounting bracket assembly has a flat top section 121 for joining to flat structural surfaces. One skilled in the art understands that flat structural surfaces may include wood structures for platforms, bracing, joists and the like and may be affixed with various fasteners such as screws or nails.

A bracket main body 120 has at least one threaded post. The example embodiment shows a first 126 and a second post 128. The first and second post 126, 128 pass through a clamping plate 130 and mate with nuts 127, 129 respectively. In some embodiments, the mounting bracket assembly is held fast to the main shaft 110 by nuts 122 and 124 which thread on the main shaft threaded portion 111 and restrict movement of the mounting bracket assembly 140 when tightened against either end. The mounting bracket assembly 140 may be moved along the threaded portion 111 of the main shaft 110 to adjust its position along the main shaft 110. A hexagonal threaded end-piece 114 threads into the threaded hole 136. In an example use of the embodiment, a power tool mates with the hexagonal threaded end-piece 114 to drive the main shaft 110 into a tree. One skilled in the art understands that a power tool may provide centered torque to prevent skewed mounting of a main shaft 110 thus preventing damage to a tree to which the main shaft 110 is being mounted.

Figure 3:
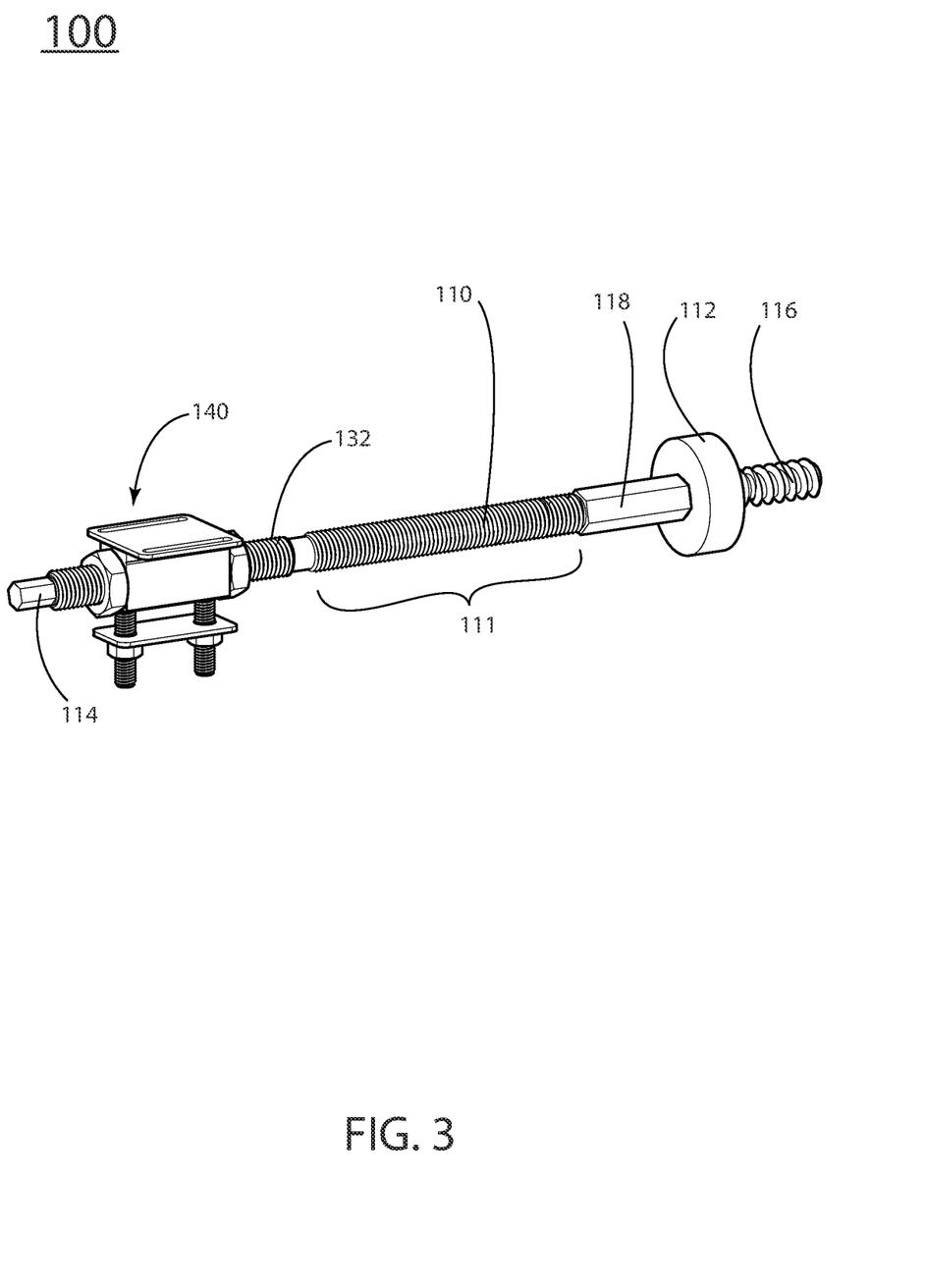
FIG. 3 is a perspective view depicting the embodiment of FIG. 1 with an extension member.
Figure 4:
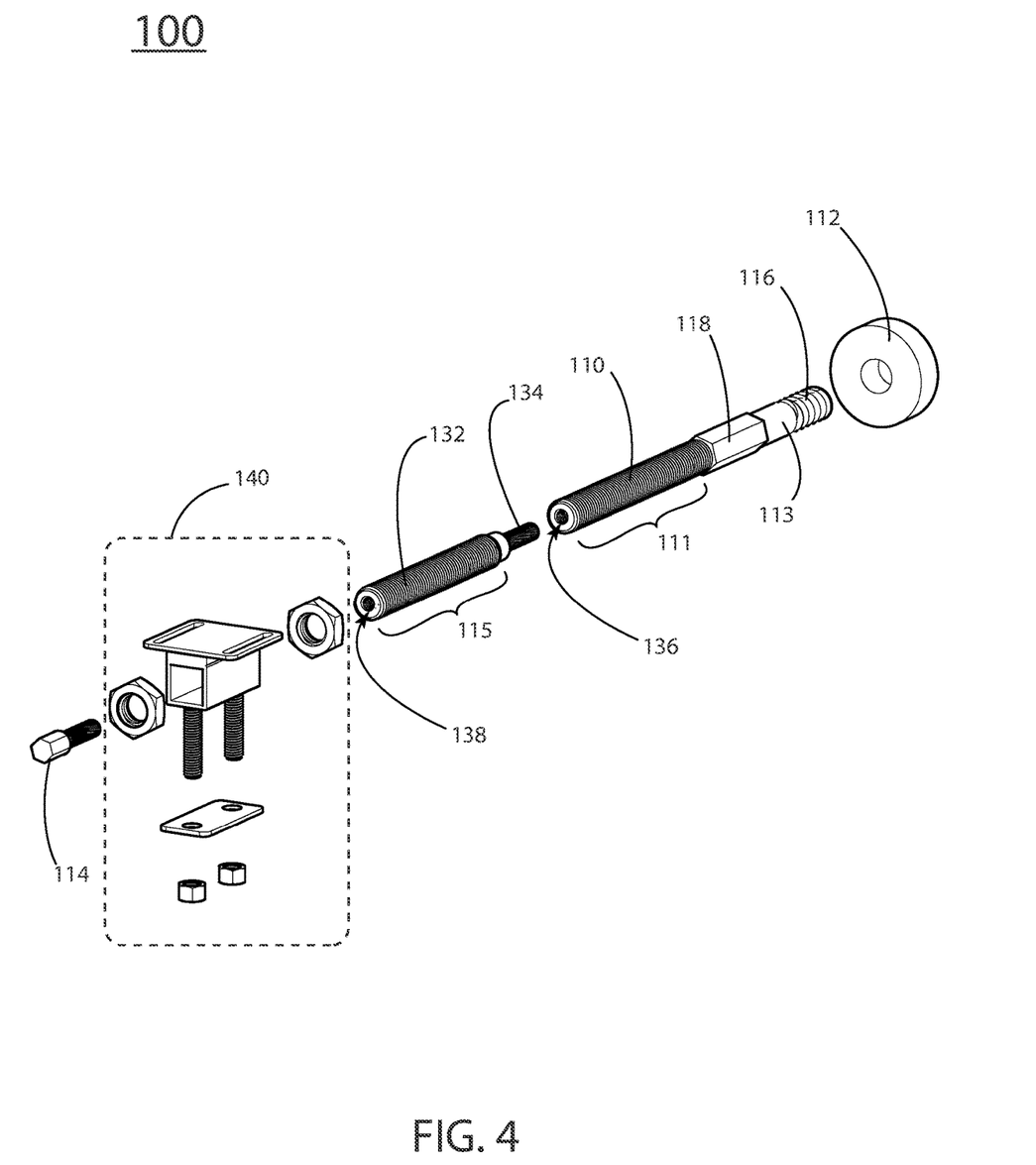
FIG. 4 is an exploded view of the embodiment of FIG. 3.

The illustration in FIG. 3 is a perspective view of the embodiment of FIG. 1 and FIG. 2 with an added extension member 132. FIG. 4 is an exploded view of the configuration of the embodiment of FIG. 3. FIGS. 3 and 4 show a main shaft 110 with a threaded portion 111, a threaded hole 136, a faceted portion 118, a smooth-shank portion 113 and a wood-screw portion 116.

The wood-screw portion 116 is disposed on the distal end of the hanger bolt's main shaft 110, while the threaded hole 136 is at the proximal end. The smooth-shank portion 113 resides proximal to the wood-screw portion 116. The faceted portion 118 is proximal to the smooth-shank portion and the threaded portion 111 is proximal to the faceted portion 118.

An extension member 132 has a threaded portion 115, a threaded post 134 at one end and a threaded hole 138 in the opposite end. The threaded post 134 mates with the threaded hole 136 in the main shaft 110. The mounting bracket assembly 140, in this configuration, is affixed to the extension member 132 about the threaded portion 115. The hexagonal threaded end-piece 114, in this configuration, threads into the threaded hole 138.

One skilled in the art understands that an example main shaft 110 may become enveloped by a tree as the tree grows and that an extension member 132, when added to the end of the main shaft 110, allows for continued use of the device.

Figure 5:
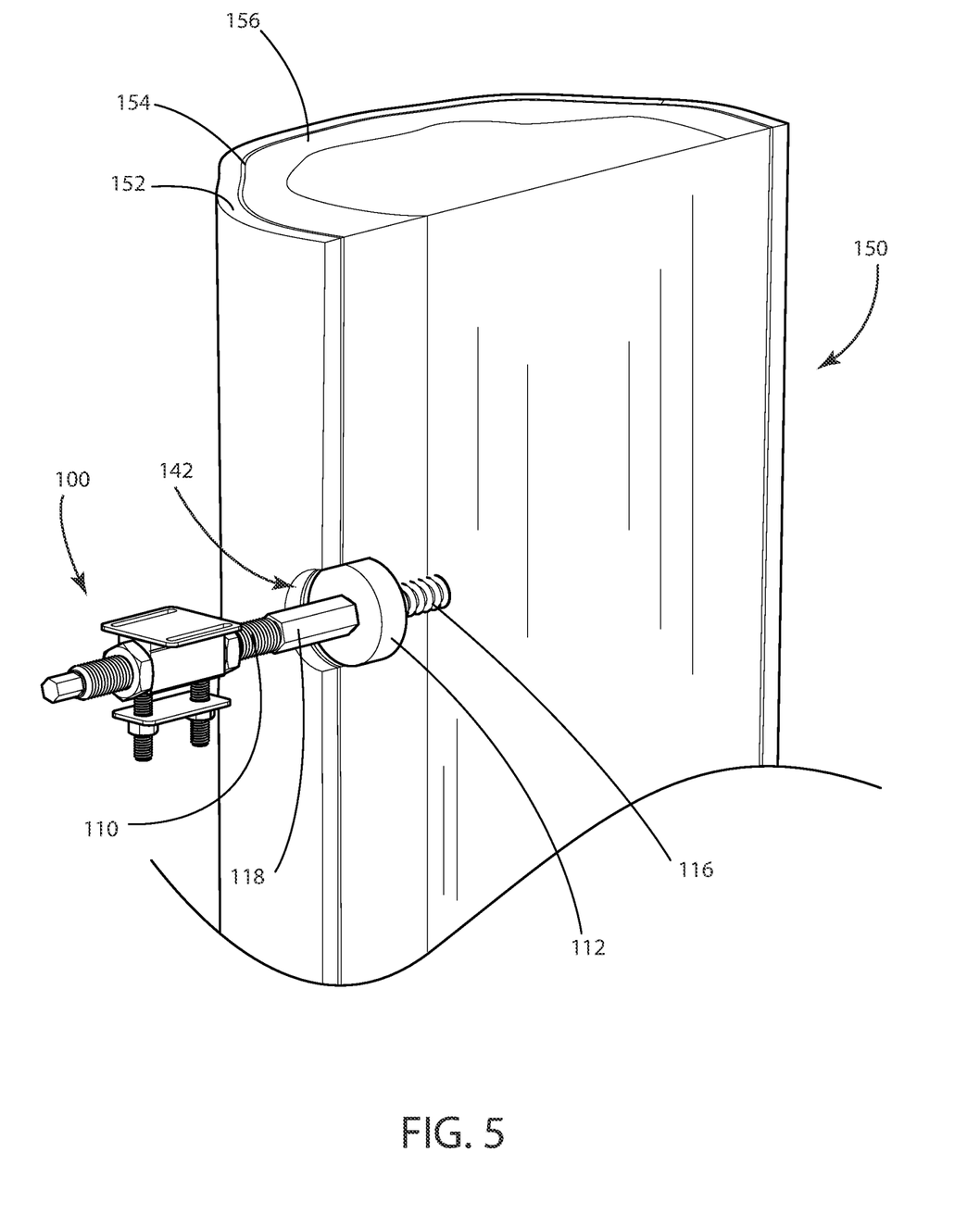
FIG. 5 is a perspective view of the embodiment of FIG. 1 installed in a tree, the tree shown in cross section.

The illustration in FIG. 5 depicts an apparatus 100 installed in a tree segment 150. A collet 112 is interchangeable; in some applications a collet of a different size is required and is inserted onto the smooth-shank portion 113 (FIG. 4) of the main shaft 110. The collet 112 fits into a hole 142 that is sized to fit tightly around the collet 112. A smaller hole drilled into the tree accommodates the wood-threaded portion 116 of the hanger bolt. The collet is embedded into the sapwood 156 of the tree, while the phloem or cambium 154 and bark 152 will seal around the collet 112 in approximately one year of growth. As the bark 152 and phloem 154 continue to grow around the apparatus 100, the faceted portion 118 will become enveloped by the tree, further securing the main shaft 110 in the tree and preventing the main shaft from rotating, while the faceted portion 118 becomes further embedded in the tree as it grows.

Figure 6:
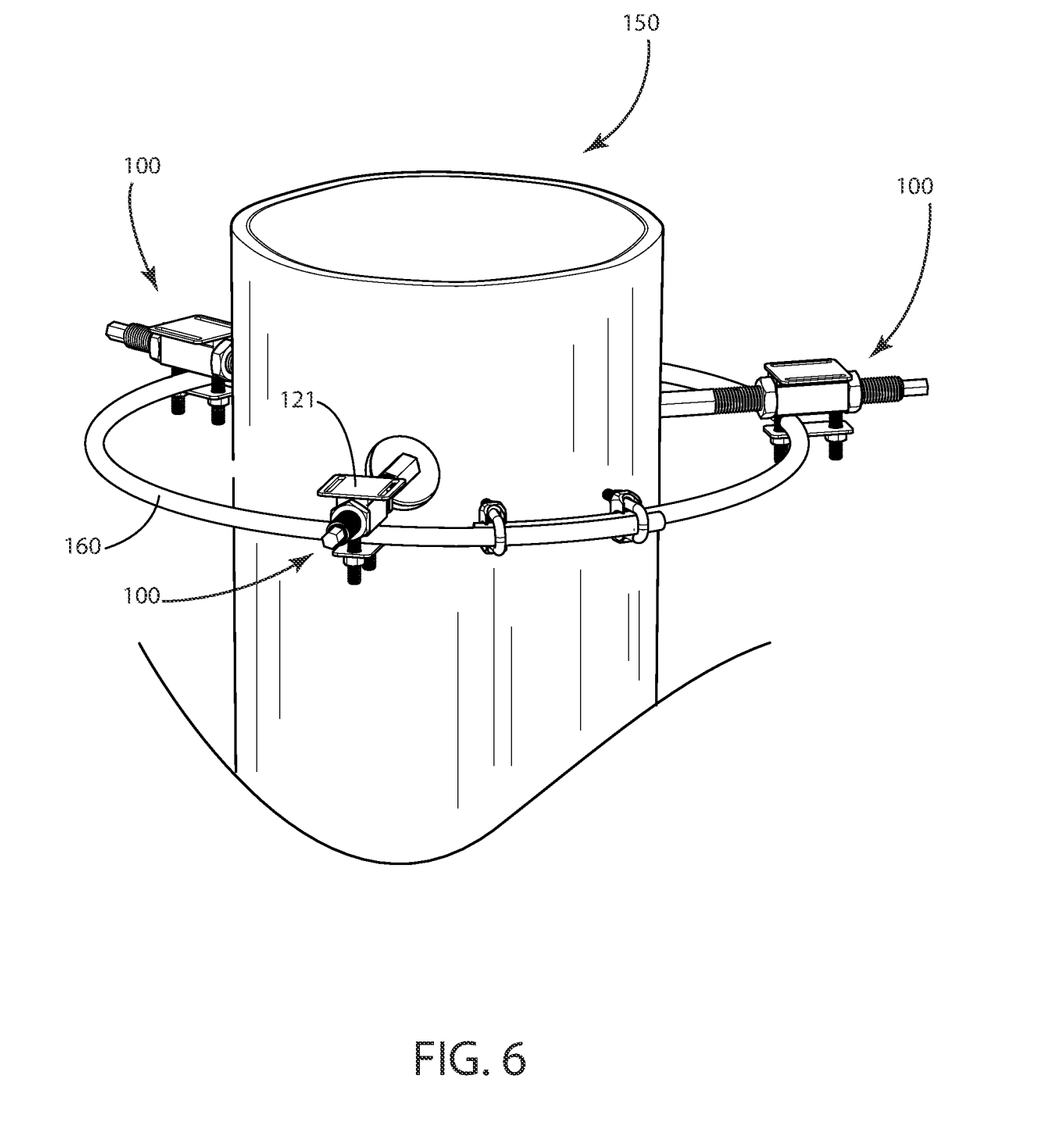
FIG. 6 is a perspective view of an array of the embodiment installed on a tree with additional hardware.

The illustration in FIG. 6 depicts an array of the apparatus 100 arranged at substantially equal heights about the trunk of a tree 150 with a ring 160 mounted in the mounting bracket assembly 140 (FIG. 4).

Figure 7:
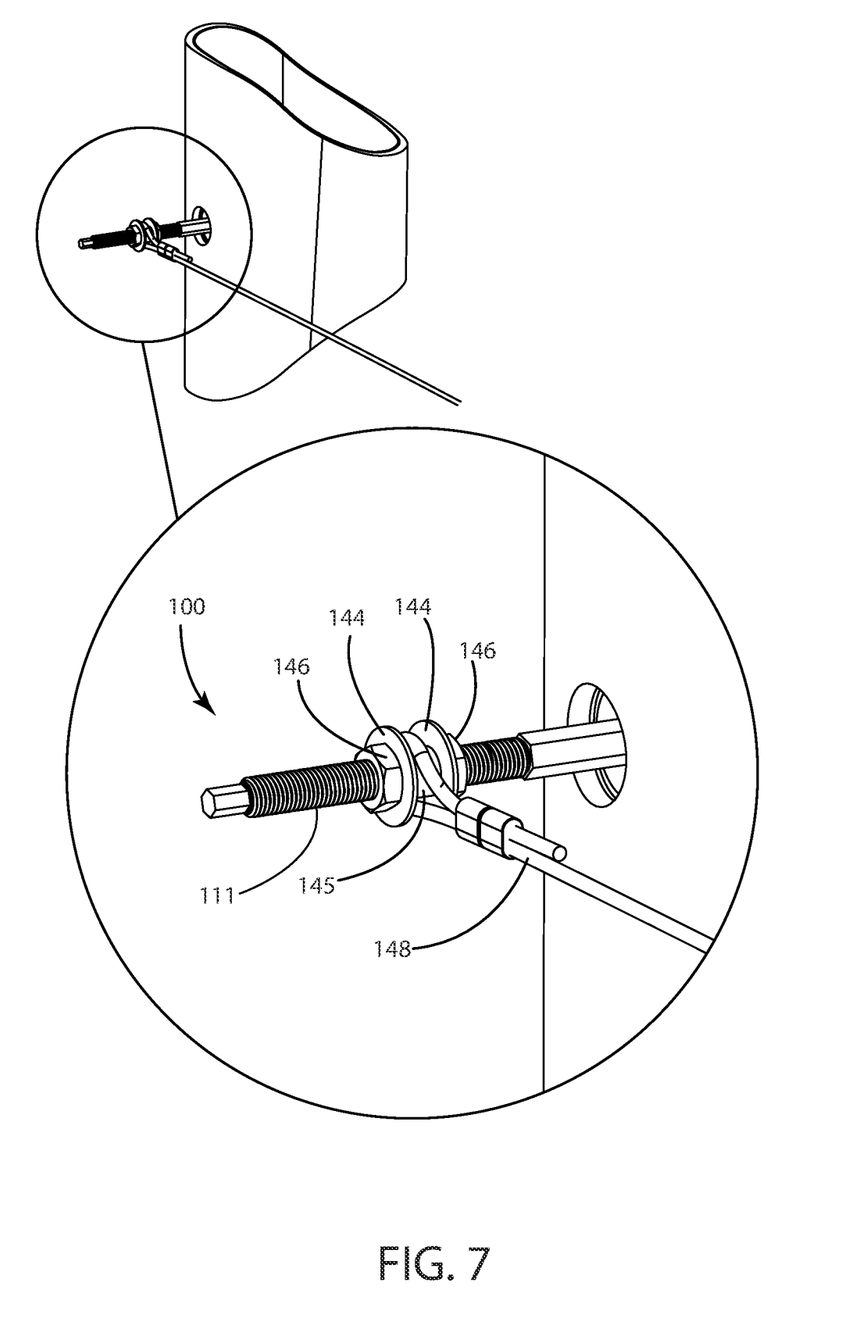
FIG. 7 is a perspective, detail view of an example embodiment connected to a cable.

FIG. 7 depicts an example of the embodiment 100 engaged with a sleeve 145 and paired washers 144 and nuts 146 arranged to fasten a cable 148 to the threaded portion 111 of the main shaft 110.

Figure 8:
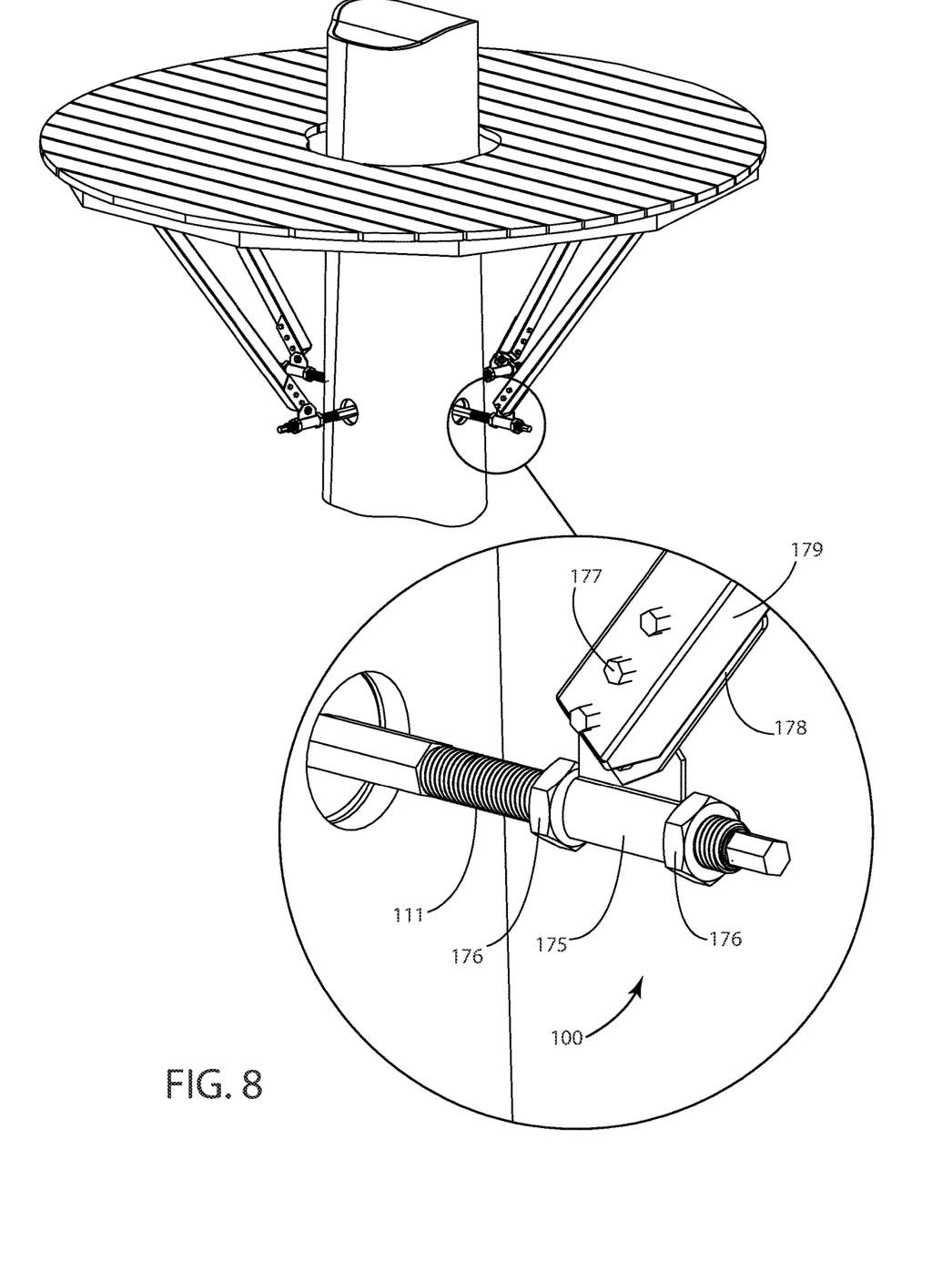
FIG. 8 is a perspective, detail view of an array of the example embodiment engaged with an angled support bracket.

FIG. 8 depicts an example embodiment 100 engaged with a tabbed sleeve 175 that pivotally connects to a bracket 178 that is affixed to a structural support member 179 by fasteners 177. The tabbed sleeve 175 is affixed to the threaded portion 111 of the embodiment 100 with nuts 176.

While example embodiments have been described herein, it is expressly noted that these embodiments should not be construed as limiting.

The invention claimed is:

1. An apparatus for attaching a structure to a tree comprising:
    an elongate cylindrical main shaft having a first end and a second end and a long central axis; and
    said first end having wood screw threads thereon; and
    said second end having a threaded hole coaxial with said long central axis; and
    said main shaft having a threaded portion on its surface proximal to said second end; and
    a faceted portion on said main shaft proximal to said threaded portion furthest from said second end; and
    a portion of smooth shank residing between said faceted portion and said wood screw threads;
    wherein said faceted portion is configured to receive a wrench to drive the wood screw threads into a tree, and said threaded portion is configured receive threaded nuts to affix hardware.

2. The apparatus of claim 1 further comprising:
    an end-piece having a first end and a second end;
    said first end being faceted; and
    said second end threaded and configured to thread into said threaded hole; wherein
    a provided power tool may be engaged with said faceted end of said end-piece to drive said wood screw threads into a tree.

3. A method for using the apparatus of claim 2, the method comprising:
    drilling a hole in a tree sufficient to accommodate said wood screw threads; and
    engaging a provided wrench to said faceted portion of said main shaft; and
    rotating said main shaft about said long central axis to start threading said wood screw threads into said tree; and
    engaging said end-piece second end with said threaded hole in said main shaft; and
    engaging a provided power tool with said end-piece first end; and
    causing said power tool to rotate;
    driving said main shaft and said wood screw threads further into said tree.

4. The apparatus of claim 1 further comprising:
    a collet having an inner diameter configured to fit on said portion of smooth shank; and
    an outer diameter configured to fit into a hole drilled into the sapwood of a tree;
    wherein cambium and bark grow over said collet such that the collet provides lateral and vertical support against movement of said main shaft when it is embedded in a tree.

5. The apparatus of claim 1 further comprising:
    a mounting bracket assembly configured to be affixed to said main shaft about said threaded portion proximal to said main shaft second end, the said mounting bracket comprising:
    a top, bottom and two sides surrounding a central hole;
    said central hole configured to receive said main shaft;
    said top being flat and configured to affix to flat surfaces;
    at least one threaded post extending downward from said bottom, configured to receive at least one nut;
    a clamping plate having at least one hole configured to receive said at least one threaded post;
    wherein a linear structural member may be clamped between said bottom and said clamping plate by engaging said at least one nut on said at least one threaded post and fastening said at least one nut and clamping plate against said linear structural member.

6. The apparatus of claim 1 further comprising:
    an extension member configured to extend the length of said main shaft comprising:
    an elongate cylindrical form of similar diameter to said main shaft having a first end and a second end;
    said first end having a threaded post configured to engage with said threaded hole of the main shaft;
    said second end having a threaded hole;
    the outer surface of the extension member, elongate cylindrical form being threaded;
    wherein as a tree grows over said main shaft, the main shaft may be extended by threading said threaded post into said main shaft threaded hole to continue use of the apparatus.

7. The apparatus of claim 1 further comprising:
    a tabbed sleeve comprising:
    a hollow cylindrical member having a top and a bottom and being configured to fit over said main shaft threaded portion and engaged with said main shaft by two nuts surrounding said hollow cylindrical member;
    a tab fixedly engaged with said top having at least one hole configured to pivotally engage with a bracket; and
    said bracket configured to support an elongate structural member,
    wherein said elongate structural member is configured to support a horizontal planar structure.

8. An apparatus for attaching a structure to a tree comprising:
    an elongate cylindrical main shaft having a first end and a second end and a long central axis; and
    said first end having wood screw threads thereon; and said second end having a threaded hole coaxial with said long central axis; and
said main shaft having a threaded portion about its surface proximal to said second end; and
a faceted portion on said main shaft proximal to said threaded portion furthest from said second end; and
a portion of smooth shank residing between said faceted portion and said wood screw threads;
a cylindrical end-piece having a first end and a second end;
said first end being faceted; and
said second end threaded and configured to thread into said threaded hole; and
a collet having an inner diameter configured to fit on said portion of smooth shank;
and an outer diameter configured to fit into a hole drilled into the sapwood of a tree;
wherein said faceted portion is configured to receive a wrench to drive the wood screw threads into a tree, and said threaded portion is configured receive threaded nuts to affix hardware; and a provided power tool may be engaged with said faceted end of said end-piece to drive said wood screw threads of said main shaft further into a tree; and cambium and bark grow over said collet such that the collet provides lateral and vertical support against movement of said main shaft when it is embedded in a tree.

9. A method for using the apparatus of claim 8, the method comprising:
slidably engaging said collet with said portion of smooth shank of said main shaft; and
drilling a hole in a tree sufficient to accommodate said wood screw threads; and
drilling a second hole in said tree sufficient to accommodate the outside diameter of said collet; and
engaging a provided wrench to said faceted portion of said main shaft; and
rotating said main shaft about said long central axis to start threading said wood screw threads into said tree; and
engaging said end-piece second end with said threaded hole in said main shaft; and
engaging a provided power tool with said end-piece first end; and causing said power tool to rotate;
driving said main shaft and said wood screw threads further into said tree; and setting said collet into said second hole.

10. An apparatus for attaching a structure to a tree comprising:
an elongate cylindrical main shaft having a first end and a second end and a long central axis; and
said first end having wood screw threads thereon; and
said second end having a threaded hole coaxial with said long central axis; and
said main shaft having a threaded portion about its surface proximal to said second end; and
a faceted portion on said main shaft proximal to said threaded portion furthest from said second end; and
a portion of smooth shank residing between said faceted portion and said wood screw threads;
a cylindrical end-piece having a first end and a second end;
said first end being faceted; and
said second end threaded and configured to thread into said threaded hole; and
a collet having an inner diameter configured to fit on said portion of smooth shank; and
an outer diameter configured to fit into a hole drilled into the sapwood of a tree; and
an extension member configured to extend the length of said main shaft comprising:
an elongate cylindrical form of similar diameter to said main shaft having a first end and a second end;
said first end having a threaded post configured to engage with said threaded hole;
said second end having a threaded hole;
the outer surface of the extension member, elongate cylindrical form being threaded;
wherein said faceted portion is configured to receive a wrench to drive the wood screw threads into a tree, and said threaded portion is configured receive threaded nuts to affix hardware; and a provided power tool may be engaged with said faceted end of said end-piece to drive said wood screw threads of said main shaft further into a tree; and cambium and bark grow over said collet such that the collet provides lateral and vertical support against movement of said main shaft when it is embedded in a tree; and as a tree grows over said main shaft, the main shaft may be extended by threading said threaded post into said main shaft threaded hole to continue use of the apparatus.

11. A method for using the apparatus of claim 10, the method comprising:
slidably engaging said collet with said portion of smooth shank of said main shaft; and
drilling a hole in a tree sufficient to accommodate said wood screw threads; and
drilling a second hole in said tree sufficient to accommodate the outside diameter of said collet; and
engaging a provided wrench to said faceted portion of said main shaft; and
rotating said main shaft about said long central axis to start threading said wood screw threads into said tree; and
engaging said end-piece second end with said threaded hole in said main shaft; and
engaging a provided power tool with said end-piece first end; and
causing said power tool to rotate; driving said main shaft and said wood screw threads further into said tree; and setting said collet into said second hole; and
removing said end-piece; and
engaging said extension member threaded first end with said threaded hole in said main shaft; and
engaging a provided wrench with said end-piece to tighten said extension member threaded end in said main shaft threaded hole.

* * * * *